United States Patent [19]

Langley et al.

[11] Patent Number: 4,938,088

[45] Date of Patent: Jul. 3, 1990

[54] VEHICLE TRANSMISSIONS

[75] Inventors: Paul A. Langley; Victor E. Strange, both of Sulihull, United Kingdom

[73] Assignee: Austin Rover Group Limited

[21] Appl. No.: 220,551

[22] Filed: Jul. 18, 1988

[30] Foreign Application Priority Data

Jul. 28, 1987 [GB] United Kingdom ............... 8717898

[51] Int. Cl.$^5$ .................... F16H 61/32; F16H 61/34
[52] U.S. Cl. ................... 74/335; 74/473 R; 192/109 A
[58] Field of Search .............. 74/335, 336 R, 337, 74/473 R; 192/109 A

[56] References Cited

U.S. PATENT DOCUMENTS

| | | | |
|---|---|---|---|
| 2,157,592 | 5/1939 | Casler | 74/335 |
| 2,346,820 | 4/1944 | Casler et al. | 74/335 |
| 2,634,622 | 4/1953 | Cripe | 74/335 |
| 2,655,042 | 10/1953 | Almond | 74/335 |
| 4,428,248 | 1/1984 | Broucksou et al. | 192/109 A X |
| 4,449,416 | 5/1984 | Huitema | 192/109 A X |
| 4,498,350 | 2/1985 | Ross | 192/109 A X |
| 4,690,008 | 9/1987 | Klatt | 74/336 R |

OTHER PUBLICATIONS

SAE Paper 840055, "Microcomputer Mechanical Clutch and Transmission Control", Watanabe et al, pp. 1-10, prior 7-18-88.

*Primary Examiner*—Allan D. Herrmann
*Attorney, Agent, or Firm*—Davis, Bujold and Streck

[57] ABSTRACT

It has been proposed to employ a constant mesh gearbox of the kind having pairs of gears on parallel shafts in constant mesh with each other, together with a clutch, in an automatic vehicle transmission. A microprocessor controls actuators for the clutch and throttle and hydraulic actuators for moving the selector rod of the gearbox, in order to give automatic operation of the gearbox.

In accordance with the invention, a constant mesh gearbox of the kind referred is provided with actuating means for moving the selector shaft and, in at least one direction of travel of the selector rod, the actuating means acts via resilient means which is arranged to store the energy of the actuating means when the actuating means is operated but the selector rod is not free to move, the rod being moved by the energized resilient means when the selector rod becomes free. More rapid shifting, and when the gearbox forms part of an automatic transmission, a shorter period of interruption of power, is possible, and reversal of torque during a gearshift can also be avoided.

13 Claims, 5 Drawing Sheets

VEHICLE TRANSMISSIONS

BACKGROUND TO THE INVENTION

This invention relates to vehicle transmissions and especially to automatic vehicle transmissions.

Conventional automatic transmissions for vehicles employ an epicyclic gearbox and fluid coupling. It has been proposed however (SAE paper 84 0055) to employ a constant mesh gearbox of the kind having pairs of gears on parallel shafts in constant mesh with each other, together with a clutch, in an automatic transmission. A microcomputer controls actuators for the clutch and throttle and hydraulic actuators for moving the selector rod of the gearbox, in order to provide automatic operation of the gearbox in dependence upon the vehicle operating conditions.

SUMMARY OF THE INVENTION

The invention provides a constant mesh gearbox of the kind having pairs of gears on parallel shafts in constant mesh with each other, comprising a selector rod which is moveable in order to select a gear ratio, actuating means for moving the selector rod, the actuating means acting on the selector rod in at least one direction of movement via resilient means which is arranged to store the energy of the actuating means when the actuating means is operated but the selector rod is not free to move in that direction of movement, the rod being moved by the energised resilient means when it becomes free.

The resilient coupling between the actuating means and the selector rod enables the actuating means to be operated before the selector rod is free to move, rather than only after the rod is free to move as in the prior proposal referred to, the rod moving rapidly when free to do so as the resilient means releases its stored energy. More rapid shifting and, when the gearbox forms part of an automatic transmission, a shorter period of interruption of power, is therefore possible.

The selector rod may be moveable in an axial direction and in a rotational direction about its axis to select the gears. The axial movement of the selector rod may correspond to gear engagement from neutral and gear disengagement to neutral, and the rotation may correspond to movement between positions neutral of various gears. Alternatively, rotation may correspond to gear engagement and disengagement and axial movement may correspond to movement between positions neutral of various gears, for example, where it is decided that the selector rod leaves the gearbox at a position turned through 90 degrees. The actuating means may act via the resilient means for both axial movements and rotational movements of the selector rod.

Advantageously, the resilient means comprises separate spring means via which the actuating means operates for axial movements and for rotational movements of the selector rod and, in either case, the same spring means may be deflected for movement in either sense.

The spring means via which the actuating means operates for movements of the selector rod corresponding to gear engagement and disengagement from and to neutral may be dual rate, for example, it may include a Belleville spring which comes into effect after a certain deflection. The spring means via which the actuating means operates for axial movements of the selector rod may include a helical spring coupled to the selector rod or to a co-axial extension thereof.

The selector rod or a coaxial extension thereof may be coupled to a transverse arm, to effect rotational movement of the selector rod and a Belleville spring may operate between coaxial parts of that arm.

Advantageously, the actuating means comprises an electric motor for axial movement of the selector rod and an electric motor for rotational movement of the selector rod.

The invention also provides an automatic transmission employing the constant mesh gearbox as defined above.

The invention also provides a method of operating an automatic transmission employing a constant mesh gearbox as defined above, in which the actuating means is operated to urge the selector rod in a direction corresponding to gear disengagement to neutral while torque is being transmitted through the gearbox.

BRIEF DESCRIPTION OF THE DRAWING

Automatic transmissions for vehicles constructed in accordance with the invention will now be described by way of example with reference to the accompanying drawings, in which.

DESCRIPTION OF THE PREFERRED EMBODIMENT

The automatic transmission comprises a constant mesh gearbox of the kind having pairs of gears on parallel shafts in constant mesh with each other, a clutch, actuating means for the selector rod of the gearbox and actuating means for the clutch and throttle of the vehicle incorporating the automatic transmission. A microprocessor controls the actuating means to provide automatic ratio selection in accordance with sensors for sensing actual vehicle operating conditions and driver demand conditions, including accelerator pedal position. Sensors are provided for sensing vehicle speed, engine speed, gearbox input shaft speed, gear ratio selected, throttle angle, clutch position, accelerator pedal position, and driving condition selected by the driver. The driver has a select mechanism for neutral, park, reverse, hold first gear, hold second gear, and two drive positions. Each drive position provides automatic transmission operation but in one position the gear ratios are selected for economy i.e. minimum specific fuel consumption, whereas in the other case the gear ratios are selected with performance in mind.

Figure 1:
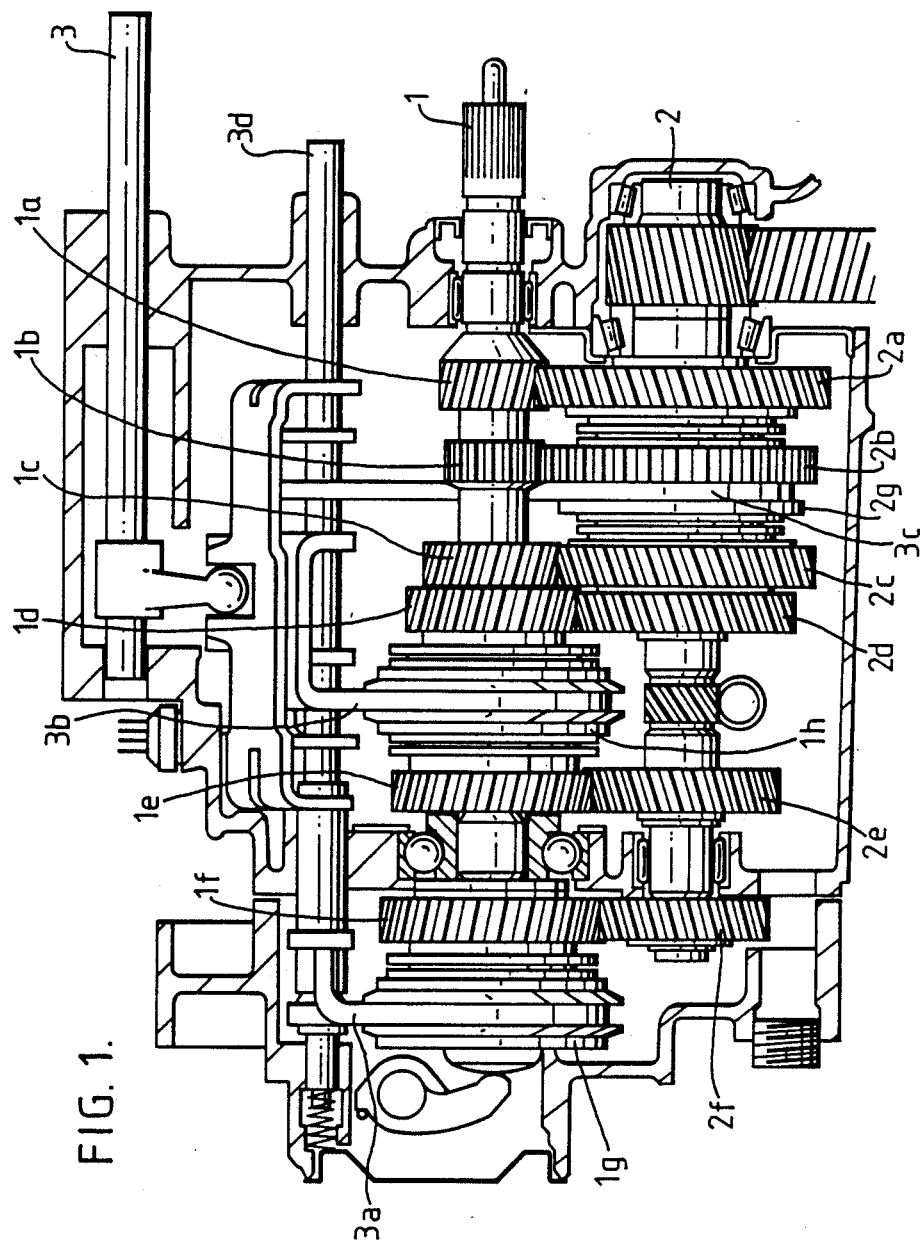
FIG. 1 is a schematic view of a constant mesh gearbox.

The invention is concerned with the actuation of the selector rod of the gearbox. Referring to FIG. 1, the gearbox is of the two shaft kind and comprises an input shaft 1 and output shaft 2. The clutch engages the right hand end of the input shaft and the right hand end of the output shaft drives a differential (not shown in the drawing). From right to left, the gears on the input shaft are respectively 1a (first gear), 1b (reverse), 1c (second gear), 1d (third gear), 1e (fourth gear) and 1f (fifth gear), all except 1b being in constant mesh with gears 2a to f on the output shaft. Synchromesh mechanisms 1g; 1h; and 2g are provided for locking gears 1f; 1d and 1e; and 2c and 2a; respectively, to their shafts to select the various ratios. This is accomplished by movement of the mechanisms along their respective shafts by means of selector forks 3a, 3b, 3c; which are carried on a selector rail 3d and are linked at the other end to a selector rod 3.

Central position of the selector rod corresponds to neutral and the six gears are respectively engaged by movement of the rod to positions to the left and to the right in an axial direction in one of three rotational orientations of the rod about its axis, that is, either central or rotated to a position in one sense or to a position in the opposite sense. Detents are provided for the three axial positions of the rod.

In a conventional arrangement the shaft 3 would be connected to a gear lever moveable in an H-gate. In the present automatic transmission, the shaft 3 is connected to actuating means controlled by the microprocessor and, in accordance with the invention, the connection is via resilient means.

Figure 2:
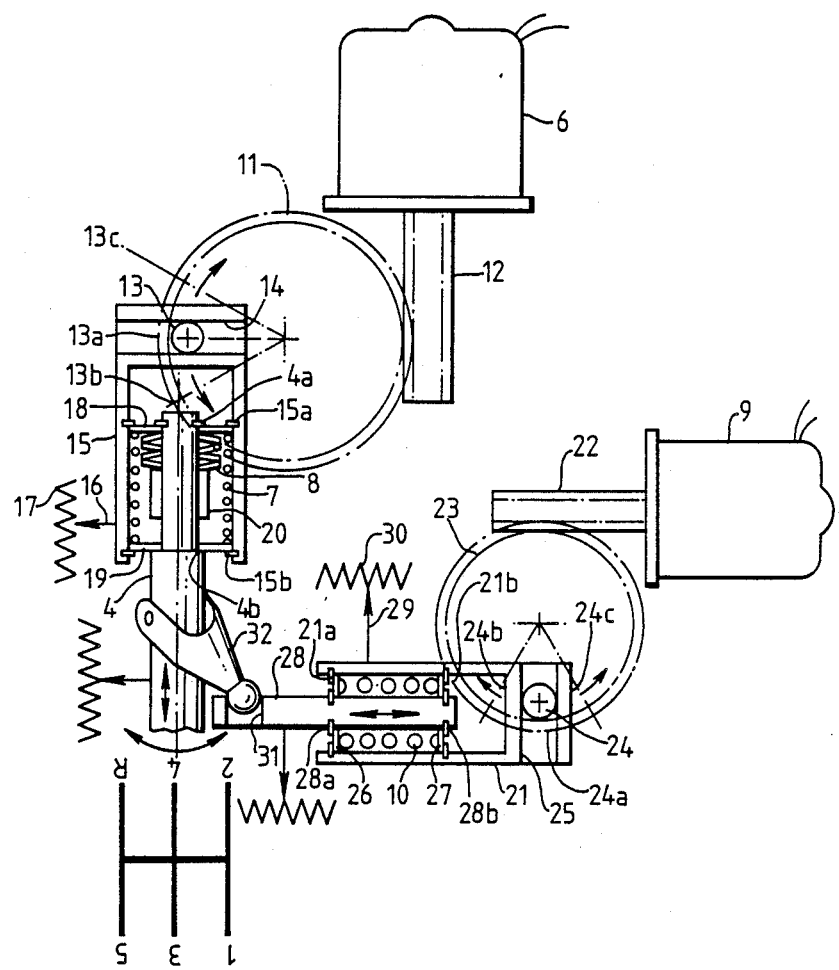
FIG. 2 is a schematic view of actuating means and resilient means for moving the selector rod of the gearbox.

Referring to FIG. 2, a shaft 4 is a coaxial extension of the shaft 3. The positions of the shaft 4 are controlled by actuating means in the form of: an electric motor and gearbox 6 acting via spring means in the form of the helical spring 7 and a Belleville spring 8, in order to control axial movement of a rod; and in the form of an electric motor and gearbox 9 acting via spring means in the form of the helical spring 10, in order to control rotational positions of the shaft.

The axial movements of the shaft 4 correspond to gear engagement from a position neutral of the desired gear and to gear disengagement to a neutral position. The rotational movements of the shaft 4 correspond to movements in neutral, which would in a conventional manual transmission be across the gate, between the three positions from which gears can be engaged.

The gear select motor and gearbox 6 drives a gear wheel 11 via a worm 12. The gear wheel 11 carries a crankpin 13 which engages in a slot 14 in a capsule 15 which retains the springs 7 and 8. The gearbox consists of a reduction mechanism which is irreversible so that when capsule 15 has been deflected through its stroke, the motor can be switched off without the capsule being able to retract. The length of time for which the motor must be switched on is controlled by a contact 16 on the capsule which runs as a moveable tapping along a rheostat 17. A particular change in resistance from the rheostat corresponds to the desired stroke of the capsule.

The helical spring 7 is pre-loaded and constrained between two washers 18, 19, as is the Belleville spring 8, except that in the case of the latter, it does not act between the two washers until they have moved sufficiently close together for a sleeve 20 attached to the Belleville spring to abut the disc 19. Discs 18, 19 are biased against abutments 4a, 15a, 4b, 15b on the shaft 4 and on the capsule 15, respectively. Thus, movement of the capsule in either direction moves the shaft via the springs.

The operation of the gear select actuating means is as follows. In order to engage a gear, the electric motor 6 is actuated and the crankpin moves steadily from position 13a to position 13b. Because the preload on spring 7 exceeds the detent force on the selector rod 3, when capsule 15 moves shaft 4 moves. When this shaft 4 moves, it moves the selector rod 3 and, after a short travel, the cones of the synchronising mechanism of the gearbox engage and the rod 3 and the shaft 4 cease to move. During the movement of the crankpin, the sleeve 20 abuts the disc 19 and the Belleville springs 8 are compressed. When this happens, an increased force is transmitted to the shaft 4 and in turn to the selector rod 3, and this provides the increase in load necessary for synchronisation.

To increase the speed of the engagement process, the movement of the crankpin is completed before sufficient time has elapsed for synchronisation with the result that, when synchronisation does take place, the final movement of the shaft 4 and selector rod 3 to move the sliding ring of the synchromesh mechanism over the dogs of the engaged gear and the selector rod to its engaged detent position is completed rapidly under the force of the spring 7.

When the gear is fully engaged, there is no force on the shaft 4 because the stroke of the capsule 15 is equal to the required movement of the shaft 4.

In the case of disengagement, the crankpin is moved from position 13b or 13c back to its central position 13a. The electric motor 6 is operated while the clutch is still in engagement and while torque consequently still is transmitted through the gearbox. Initially, the capsule 15 moves but the shaft 4 does not move because the coupling mechanism cannot be disengaged. However, the microprocessor simultaneously to operating the motor 6 operates an actuator to declutch the engine. At the point when the engine is declutched, the tensioned spring 7 pulls the shaft 4, the selector rod 3, and its fork towards the neutral position. The time taken for the crankpin to move to position 13a is such that the Belleville spring has not yet been compressed before declutching has taken place, because otherwise an excessive force would be exerted on the sliding ring of the coupling mechanism and the dogs of the engaged gear. The stroke of the electric motor is completed with the spring 7 returned to its original (pre-loaded) length, and the selector rod 3 returns to its neutral position.

It will be seen the advantage of the resilient coupling between the actuating means and the selector rod is that operation of the actuating means can be simultaneous with that for declutching the engine, rather than after (in practice with a margin for safety). The overall shift time is therefore reduced.

The advantage of the two springs giving a dual rate, is that an increased load is available for engagement, but cannot be applied on disengagement which could damage the dogs on the gears or the internal teeth on the coupling rings.

In the case of upshifts, where an actuator also closes the vehicle throttle, to accommodate the fact that the input shaft must be slowed, a point is reached where there is no net flow of torque through the gearbox. This point may be reached before the actuator has disengaged the clutch. Nevertheless, the coupling mechanism is free to be disengaged at this point, and the use of the resilient means ensures the disengagement does take place at this moment, under the action of the spring 7. The use of the resilient means provides an additional advantage in this case because if disengagement had to wait for a positive mechanical actuator after the clutch and throttle actuators had been operated, torque reversal would take place after the point of no net flow of torque through the gearbox which would manifest itself as a sudden deceleration of the vehicle as engine braking began, manifesting itself as undesirable shift quality.

Figure 3:
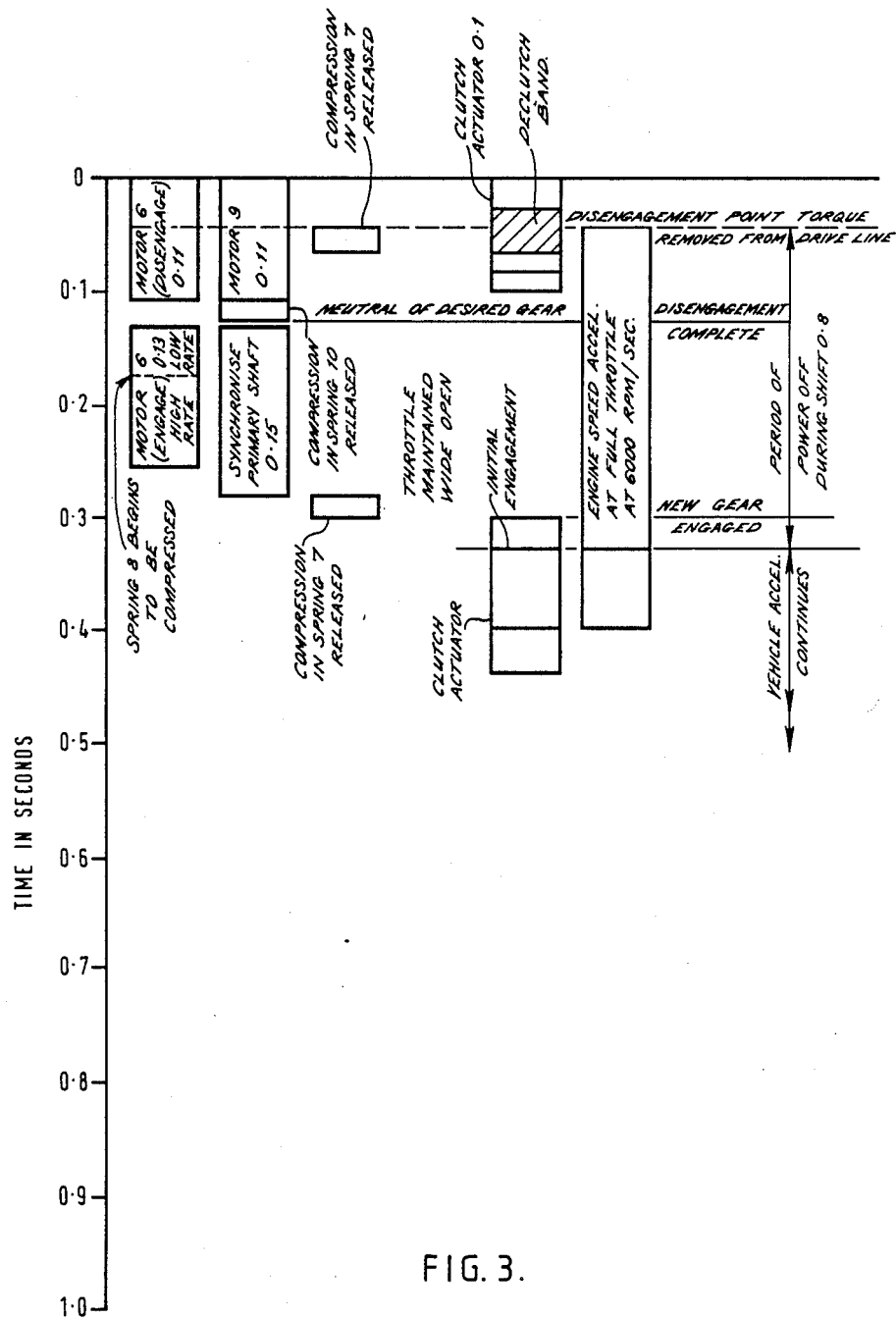
FIG. 3 is a block diagram of the operations for a typical downward gear shift.

FIG. 3 indicates in block diagram form the sequence of events for a typical gear down-shift, in this case, a maximum throttle down-shift from third gear to second gear. It will be noted that the motors 6 and 9 can be operated while the clutch actuator is in operation rather than after the clutch actuator has completed its operation. Immediately the clutch is disengaged, the shaft 4 is immediately moved by the action of the spring 7 the same distance as the crankpin has moved the capsule, thereby disengaging gear. When the motor 6 has completed its stroke and the selector rod is in neutral, the shaft 4 is rotated very rapidly by the tensioned spring 10 of the capsule 21, in considerably less time than it took the motor 9 to tension the spring. The motor 6 is then operated again. The pre-load on the spring 7 exceeds the detent force on the rod and the rod is moved out of neutral. The motor continues its stroke but the rod ceases to move as the synchronising mechanism on the gearbox engages. Only when the high rate Belleville spring is compressed is the increased force on the selector rod available for synchronisation. When the primary shaft of the gearbox has been synchronised with the secondary shaft, the remaining movement of the selector rod is performed very rapidly as the energy stored by the tension springs 7 and 8 is released. The clutch actuator is then operated. It will be seen that the period of power off during shift is extremely short.

Figure 4:
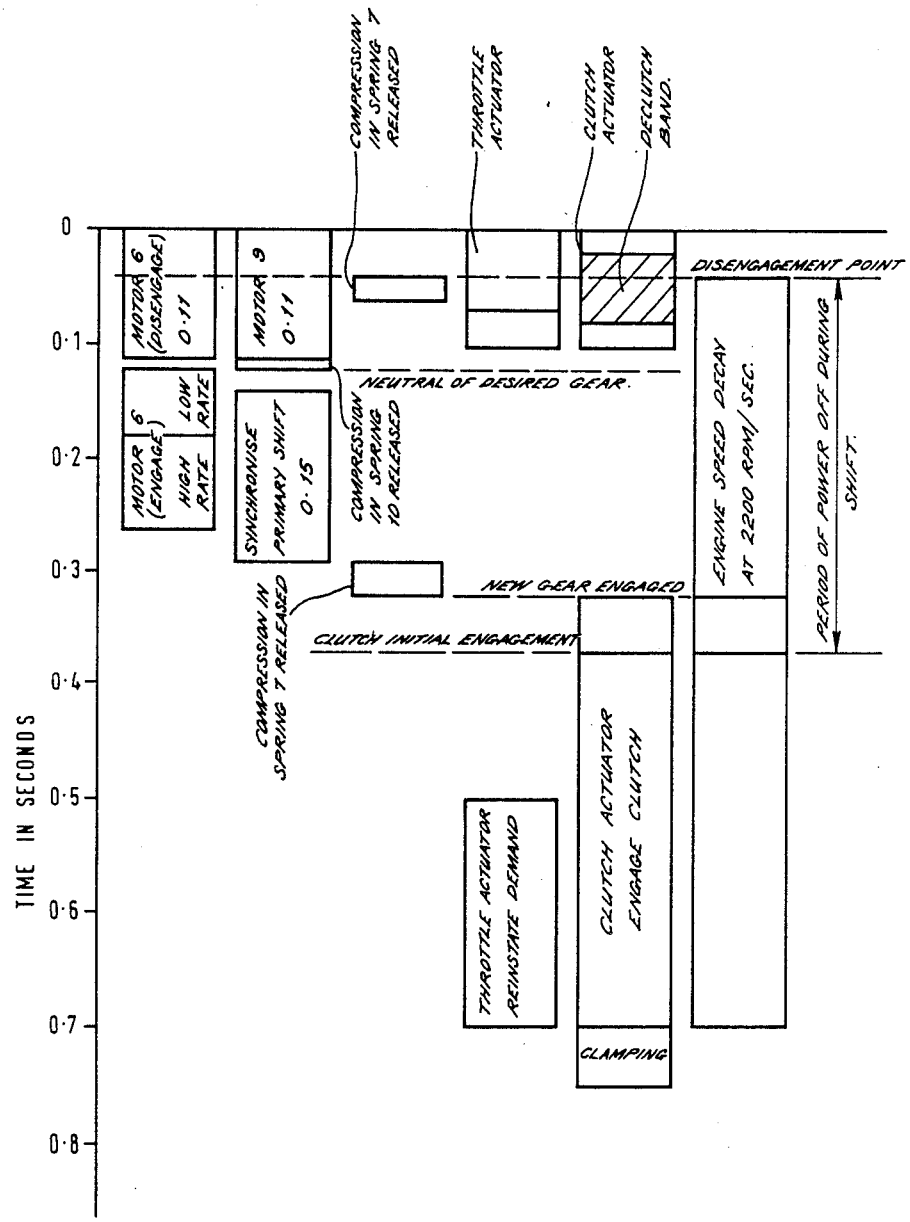
FIG. 4 a block diagram of the operations for a typical upward gear shift.

FIG. 4 indicates in block diagram form the sequence of events for a typical gear up-shift, in this case, a maximum throttle up-shift from second gear to third gear.

As for the down-shift of FIG. 3, the motors 6 and 9 are operated while the clutch actuator is in operation. In addition, the throttle actuator is also operated at the same time. (The throttle actuator is operated because the input shaft of the gearbox must be slowed). Immediatedly the point is reached where there is no net flow of torque through the gearbox (either due to disengagement of the clutch or due to the reduction of the engine throttle), the spring 7 moves the shaft 4 the same distance by which it has been compressed, thereby disengaging gear and ensuring that, no matter how rapidly the throttle has been reduced, reverse torque is not applied to the gearbox.

The remainder of the operation of the gearbox for the up-shift is the same as for the down-shift described with reference to FIG. 3, except that the throttle actuator is restored as the clutch is re-engaged, rather than the throttle being maintained wide open during the shift as in FIG. 3.

The motor and gearbox 9 for movement between the positions neutral of the various gears, corresponding to movement of the gear lever across the gate of a conventional manual gearbox arrangement, is generally similar to the motor and gearbox 6, but the capsule 21 through which it operates has a single helical spring 10 in place of two springs 6, 7. The drive is via worm 22 and gearwheel 23 bearing a crankpin 24 which is moveable in a slot 25 in the capsule. Washers 26 and 27 are pre-loaded between abutments 21a, 21b on the capsule 21 and 28a, 28b on the shaft 28 by the spring 10. The reduction gear of the gearbox is such that the worm 22 cannot be reversed by any load on it from the compressed spring 10, even when the motor is switched off. A contact 29 moveable over a rheostat 30 controls the operation of the motor in the same way as the rheostat 17 controls the motor 9.

The shaft 28 has a hole 31 for reception at one end of a yoke 32, the other end of which is pivotably connected to the shaft 4. Depending on whether the crankpin 24 is in a central position 24a or deflected positions 24b or 24c, the rotational position of the shaft 4 corresponds to reverse or fifth gear, third or fourth gear, or first or second gear. In operation, if it is desired to change gear in a way that involves "cross-gate" movement the electric motor 9 may be operated at the same time as the gear select motor 6 which performs the disengagement. At least during the initial stroke of the motor 9, the shaft 4 cannot twist and the motor 9 moves the capsule 21 and compresses the spring 10. The "cross-gate" movement cannot be performed until the disengage movement has been completed, since only in neutral is the selector rod free to twist about its axis.

When, but only when, disengagement is complete, the shaft 4 is free to rotate and the spring 10 moves the shaft 28 the same distance as the motor moved the capsule 21. At the end of this stroke there is no net spring force on the yoke 32.

The advantage of the resilient coupling between the actuating means and the selector rod is that the rotation of the selector rod is performed much more quickly by the spring 10 releasing its energy than if the actuating means operated directly on the selector rod. More rapid shifting and, especially, a reduction of the time for which the engine is decoupled from the vehicle wheels, is achieved.

An advantage of the use of electric motors for the actuating means is that no power is consumed once the actuating means has completed its stroke. However, if desired, hydraulic or other actuating means could be employed.

Of course variations to the described arrangement are possible without departing from the scope of the invention. Thus, the Belleville springs 8 could be omitted (synchronisation would however take longer) and other forms of resilient means could be used in place of the springs 7, 8 and 10.

Hydraulic or pneumatic actuating means for example a piston and cylinder could be used in place of the electric motor.

As an alternative to the gearbox for the motors being irreversible, a brake or clutch could be applied to the motor shafts to prevent reverse movement of the capsules 15, 21.

Equally, rotational movements of the selector rod 3 could correspond to gear engagement and disengagement, and axial movement of the selector rod could correspond to movements in neutral. This could be achieved by turning the selector rod through 90 degrees, so that its axis was orientated at right angles to the plane of the drawing. In certain situations, this could give advantages from the point of view of packaging.

The gearbox could employ three shafts bearing the gears instead of the two illustrated, that is, input, coaxial output, and parallel lay shaft.

Instead of having one selector rail 3d to carry the selector forks to select the gears, separate selector rails for each fork could be provided.

It is not essential for both spring means to be provided. Thus, the spring means 7, 8 could be provided for axial movements of the selector rod while the "cross-gate" rotations of the selector rod 3 between neutral positions for different gears could be performed positively by the electric motor and gearbox 9, the spring means 10 being omitted. Alternatively, the spring 7, 8 could be omitted and only the spring 10 provided, so that movements in neutral between neutral positions for different gears are performed under the influence of the resilient means, whereas the movement into gear from neutral and out of gear to neutral are performed positively.

Figure 5:
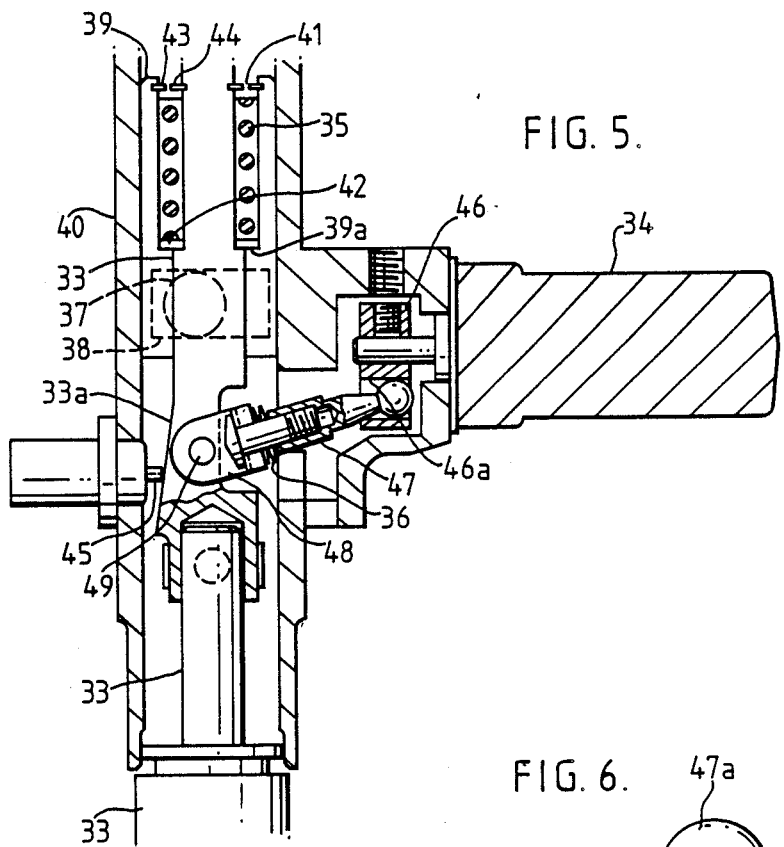
FIG. 5 is an axial cross-section of a further embodiment of actuating means and resilient means for moving the selector rod.
Figure 6:
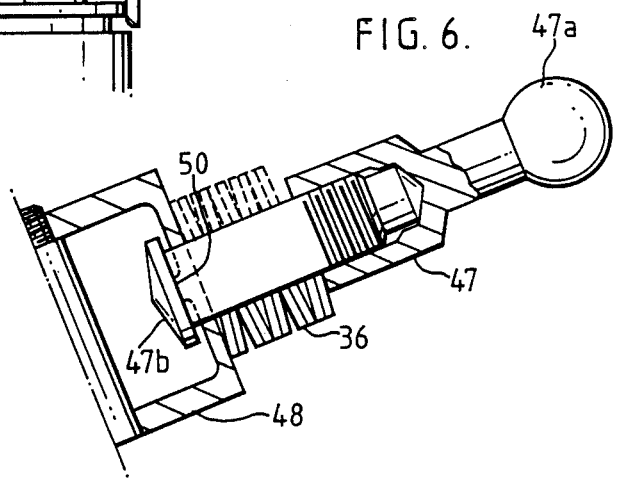
FIG. 6 is an enlarged view of a part of the embodiment of FIG. 5.

Referring to FIGS. 5 and 6, a further embodiment of actuating means and resilient means for acting on the selector rod of the gearbox shown in FIG. 1 is illustrated. The shaft 33 is a coaxial extension of the selector rod 3.

The shaft 33 is controlled for axial and rotational movement by actuating means in the form of an electric motor (not shown) for axial movement and an electric motor and gearbox 34 for rotational movement and resilient means in the form of spring means consisting of a helical spring 35 for axial movement of the shaft 33 and spring means consisting of Belleville springs 36 for rotational movement.

The motor (not shown) for axial movement operates a gear wheel bearing a crankpin via an irreversible drive as in FIG. 2, and only the crankpin 37 is illustrated. This is moveable in the slot 38 in a hollow sleeve 39 which is guided for movement within a fixed outer sleeve 40. The spring 35 is restrained in pre-loaded condition between washer 42 urged against a shoulder 39a on the hollow sleeve 39 and washer 41 held in by circlips 43 and 44 on the hollow sleeve and shaft 33, respectively.

The central section of the shaft 33 is tapered at 33a and is engaged by spring-loaded rheostat 45 to indicate the stroke of the selector shaft.

Although axial control of the shaft 33 is similar to that of the shaft 4, the rotational control of the shaft is different in that, although the electric motor 34 operates via an irreversible reduction gear, helical spring 10 is replaced by the Belleville springs 36. The motor 34 drives a lever 46 having a hole 46a which performs a sector of movement under the control of the motor.

An arm consisting of two coaxial parts 47, 48 connects the hole 46a with the shaft 33. The part 47 has a ball 47a at one end in the hole 46a and the other end of the arm is received in a recess in the shaft 33 in such a way that the centre line of the arm intersects the axis of the shaft. The part 48 is pivoted to the shaft on pin 49. The part 48 is a forked clevis defining an aperture through which the part 47 extends and is retained with its head 47b inside the fork.

The shaft 33 is rotated by operating electric motor 34 so that the lever 46 rotates through a predetermined sector. As seen in FIG. 5, the ball 47a is lifted out of the plane of the paper. This in turn has the effect of twisting the shaft 33 about its axis. The ball can also be deflected to a position below the plane of the paper to twist the shaft 33 in the opposite sense. Shaft 33 can thus be moved to rotate the selector rod between the neutral positions for different gears.

If the motor 34 is operated but the shaft 33 is not free to twist e.g. if electric motors for axial and rotary movement of the shaft are operated at the same time, then the part 47 of springs 36 are compressed. Referring to FIG. 6, which shows the junction of the parts 47 and 48 on an enlarged scale, the head 47b of the part 47 pivots on a fulcrum 50 which is smaller in area than the head, and one side of the Belleville springs is compressed. (The normal pre-loaded shape of the spring is shown in full line while the compressed shape is shown in broken line). When the shaft 33 is free to twist, it is twisted rapidly as the Belleville springs 36 return to their initial state.

The operation of the actuating means and resilient means shown in FIGS. 5 and 6 is the same as that shown in FIG. 2, and the modifications which may be made to the embodiment of FIG. 2 may also be made to the embodiment of FIGS. 5 and 6.

We claim:

1. A constant mesh gearbox of the kind having pairs of gears on parallel shafts in constant mesh with each other, comprising a selector rod which is moveable in an axial direction and in a rotational direction about its axis in order to select a gear ratio and actuating means for moving the selector rod in both directions of movement to a desired position via resilient means, the arrangement being such that when the actuating means is moved to a position corresponding to a desired position of the selector rod, but the selector rod is not free to move in that direction of movement, the resilient means is preloaded to store the energy corresponding to the desired selector rod movement until the selector rod is free to move whereupon the resilient means will unload to move the selector rod to the desired position.

2. A gearbox as claimed in claim 1, in which the resilient means comprises separate spring means via which the actuating means operates for axial movements and rotational movements of the selector rod.

3. A gearbox as claimed in claim 1, in which the spring means via which the actuating means operates for movements of the selector rod corresponding to gear engagement and disengagement from and to neutral is dual rate, providing an increased rate of resistance after it has been deflected over a certain travel.

4. A gearbox as claimed in claim 2, in which the spring means via which the actuating means operates for axial movements of the selector rod includes a helical spring coupled to the selector rod or to a coaxial extension thereof.

5. A gearbox as claimed in claim 4, in which the actuating means includes an electric motor for axial movement of the selector rod.

6. A gearbox as claimed in claim 5, in which the actuating means includes an irreversible reduction gear through which the motor operates.

7. A gearbox as claimed in claim 1, in which the selector rod or a coaxial extension thereof is coupled to a transverse arm, to effect rotational movement of the selector rod.

8. A gearbox as claimed in claim 7, in which the resilient means via which the actuating means operates for rotational movement of the selector rod includes a Belleville spring arranged between two coaxial parts which together form the transverse arm.

9. A gearbox as claimed in claim 7, in which the actuating means includes an electric motor for rotational movement of the selector rod.

10. A gearbox as claimed in claim 9, in which the electric motor operates via an irreversible reduction gear.

11. An automatic transmission including a constant mesh gear box of the kind having pairs of gears on parallel shafts in constant mesh with each other, comprising a selector rod which is moveable in an axial direction and in a rotational direction about its axis in order to select a gear ratio and actuating means for moving the selector rod in both directions of movement to a desired position via resilient means, the arrangement being such that when the actuating means is moved to a position corresponding to a desired position of the selector rod, but the selector rod is not free to move in that direction of movement, the resilient means is preloaded to store the energy corresponding to the desired selector rod movement until the selector rod is free to move whereupon the resilient means will unload to move the selector rod to the desired position.

12. A method of operating an automatic transmission employing a constant mesh gearbox of the kind having pairs of gears on parallel shafts in constant mesh with each other, comprising a selector rod which is moveable in an axial direction and in a rotational direction about its axis in order to select a gear ratio and actuating means for moving the selector rod in both directions of movement to a desired position via resilient means, the arrangement being such that when the actuating means is moved to a position corresponding to a desired position of the selector rod, but the selector rod is not free to move in that direction of movement, the resilient means is preloaded to store the energy corresponding to the desired selector rod movement until the selector rod is free to move whereupon the resilient means will unload to move the selector rod to the desired position, in which the actuating means is operated to urge the selector rod in a direction corresponding to gear disengagement to neutral while torque is being transmitted through the gearbox.

13. A method as claimed in claim 12, in which the actuating means is operated to urge the selector rod in a direction between neutral positions before movement of the selector rod for disengagement of a gear from neutral has been completed.

* * * * *